(12) United States Patent
Doyle et al.

(10) Patent No.: US 11,235,625 B2
(45) Date of Patent: Feb. 1, 2022

(54) IMPLEMENTING TIRE TREAD DEPTH AND WEAR PATTERNS MONITORING WITH RFID

(71) Applicant: International Business Machines Corporation, Armonk, NY (US)

(72) Inventors: Matthew S. Doyle, Chatfield, MN (US); Layne A. Berge, Rochester, MN (US); Jason J. Bjorgaard, Rochester, MN (US); John R. Dangler, Rochester, MN (US); Thomas W. Liang, Rochester, MN (US); Manuel Orozco, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 516 days.

(21) Appl. No.: 16/173,304

(22) Filed: Oct. 29, 2018

(65) Prior Publication Data

US 2020/0130421 A1    Apr. 30, 2020

(51) Int. Cl.
*B60C 11/24*    (2006.01)
*B60C 23/06*    (2006.01)
(Continued)

(52) U.S. Cl.
CPC ......... *B60C 11/243* (2013.01); *B60C 11/246* (2013.01); *B60C 23/064* (2013.01); *G01M 17/02* (2013.01); *H01Q 1/2241* (2013.01)

(58) Field of Classification Search
CPC .. G01M 17/02; G01M 17/021; G01M 17/022; G01M 17/027; G01M 17/025; G01M 17/024; G01M 17/10; G01M 1/045; G01M 7/08; G01M 17/0076; G01M 17/013; G01M 17/03; G01M 17/04; G01M 17/06; G01M 17/08; G01M 1/02; G01M 1/12; G01M 1/16; G01M 1/225; G01M 3/04; G01M 3/40; G01M 5/0091; G01M 7/02; G01M 99/00; G01M 99/002; B60C 23/0494; B60C 2019/004; B60C 23/0493; B60C 23/064; B60C 19/00; B60C 23/04; B60C 23/0488; B60C 23/0498; B60C 23/0496; B60C 23/0408; B60C 23/041; B60C 23/0411; B60C 23/06; B60C 23/20; B60C 11/246; B60C 23/0486;
(Continued)

(56) References Cited

U.S. PATENT DOCUMENTS 7,180,409 B2   2/2007 Brey
7,775,094 B2   8/2010 Awad
(Continued)

FOREIGN PATENT DOCUMENTS

EP       2995474 A1    3/2016
WO   WO2016109109 A1    7/2016

*Primary Examiner* — Andre J Allen
(74) *Attorney, Agent, or Firm* — Nathan M. Rau

(57) ABSTRACT

A method, system and computer program product are provided for implementing tire tread depth and wear patterns monitoring. A radio frequency identification (RFID) tag is provided with an associated tire to be monitored. A dipole antenna structure is coupled to the RFID tag and routed within a position in the tire tread and routed substantially circumferentially in the associated tire. A resonant frequency of the dipole antenna structure is detected to monitor tire tread wear.

16 Claims, 6 Drawing Sheets

(51) Int. Cl.
*G01M 17/02* (2006.01)
*H01Q 1/22* (2006.01)

(58) Field of Classification Search
CPC ..... B60C 23/061; B60C 11/243; B60C 99/00; B60C 11/0083; B60C 13/003; B60C 2009/2038; B60C 23/004; B60C 23/02; B60C 23/0401; B60C 23/0406; B60C 23/0416; B60C 23/0433; B60C 23/0455; B60C 23/0459; B60C 23/0474; B60C 23/0489; B60C 23/0491; B60C 25/002; B60C 25/005; B60C 25/007; B60C 29/02; B60C 3/04; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/00; B60C 23/001; B60C 23/003; B60C 23/007; B60C 23/008; B60C 23/0413; B60C 23/0427; B60C 23/0447; B60C 23/0454; B60C 23/0457; B60C 23/0462; B60C 23/0471; B60C 23/0472; B60C 23/0476; B60C 23/0479; B60C 23/0484; B60C 23/065; B60C 23/066; B60C 23/10; B60C 25/0548; B60C 25/056; B60C 25/132; B60C 25/138; B60C 29/005; B60C 9/005; B60C 9/18; B60C 9/1807; B60C 9/20; B60C 9/28

USPC .................................................. 73/146–146.8
See application file for complete search history.

(56) References Cited

U.S. PATENT DOCUMENTS

| | | | |
|---|---|---|---|
| 8,157,172 | B2 | 4/2012 | Fenkanyn |
| 9,944,131 | B2 | 4/2018 | Wei et al. |
| 2006/0124214 | A1 | 6/2006 | Bauchot et al. |
| 2006/0208902 | A1* | 9/2006 | Brey ........................ B60C 11/24 340/572.8 |
| 2006/0290484 | A1* | 12/2006 | Bauchot ............... B60C 23/0416 340/442 |
| 2007/0222614 | A1 | 9/2007 | Rapp |
| 2007/0252719 | A1 | 11/2007 | Ray |
| 2008/0084285 | A1* | 4/2008 | Bhogal .................... B60C 11/24 340/438 |
| 2015/0075693 | A1* | 3/2015 | Dorfi .................. B29D 30/0061 152/523 |
| 2016/0031272 | A1* | 2/2016 | Peine .................. B60C 23/0493 340/442 |
| 2016/0075189 | A1* | 3/2016 | Engel ...................... B60C 11/24 340/438 |
| 2017/0361661 | A1* | 12/2017 | Wei .................. G06K 19/07764 |
| 2018/0222260 | A1* | 8/2018 | Xue .................... B60C 23/0452 |
| 2019/0184763 | A1* | 6/2019 | Pulford ................. B60C 11/246 |
| 2019/0193479 | A1* | 6/2019 | Pulford .................. H01Q 21/28 |
| 2019/0193480 | A1* | 6/2019 | Pulford ................. B60C 11/246 |

* cited by examiner

IMPLEMENTING TIRE TREAD DEPTH AND WEAR PATTERNS MONITORING WITH RFID

FIELD OF THE DISCLOSURE

The present disclosure relates generally to the data processing field, and more particularly, relates to a method, system and computer program product for implementing tire tread depth and wear patterns monitoring with the use of radio frequency identification (RFID) devices or tags.

BACKGROUND

Existing solutions utilize the process of embedding an actual RFID tag or multiple RFID tags into the rubber layers of a conventional tire. However, embedding tags within the tire changes the rubber laminate and materials, adding both cost, complexity, and risk to the end product.

A need exists for an efficient and effective mechanism for implementing enhanced tire tread depth and wear patterns monitoring with the use of radio frequency identification (RFID) devices in a manner which lowers risk and impacts to the tire laminate by only injecting an antenna into the tire compound.

SUMMARY OF THE DISCLOSURE

Principal aspects of the present disclosure are to provide a method, system and computer program product for implementing tire tread depth and wear patterns monitoring with the use of radio frequency identification (RFID) devices or tags. Other important aspects of the present disclosure are to provide such method, system and computer program product substantially without negative effects and that overcome many of the disadvantages of prior art arrangements.

In brief, a method, system and computer program product are provided for implementing tire tread depth and wear patterns monitoring. A radio frequency identification (RFID) tag is provided with an associated tire to be monitored. A dipole antenna structure is coupled to the RFID tag and routed within a position in the tire tread and routed substantially circumferentially in the associated tire. A resonant frequency of the dipole antenna structure is detected to monitor tire tread wear.

In accordance with features of the disclosure, the RFID tag optionally is mounted on a rim on which the tire is mounted. The RFID tag optionally is mounted within a non-tread portion of the tire without being embedded within tire layers.

In accordance with features of the disclosure, the dipole antenna structure includes more than one antenna.

In accordance with features of the disclosure, the dipole antenna structure includes more than one antenna, with the RFID tag detecting resonant frequency changes to monitor ripple wear in tire tread.

In accordance with features of the disclosure, the dipole antenna structure includes more than one antenna, with the RFID tag detecting resonant frequency changes to monitor arc wear in tire tread.

In accordance with features of the disclosure, the dipole antenna structure includes more than one antenna, with the RFID tag detecting resonant frequency changes to monitor point wear in tire tread.

BRIEF DESCRIPTION OF THE DRAWINGS

The present disclosure together with the above and other objects and advantages may best be understood from the following detailed description of the preferred embodiments of the disclosure illustrated in the drawings, wherein.

DETAILED DESCRIPTION OF THE PREFERRED EMBODIMENTS

In the following detailed description of embodiments of the disclosure, reference is made to the accompanying drawings, which illustrate example embodiments by which the disclosure may be practiced. It is to be understood that other embodiments may be utilized and structural changes may be made without departing from the scope of the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the disclosure, a method and system are provided for implementing enhanced tire tread depth and wear patterns monitoring with the use of radio frequency identification (RFID) devices or tags. A radio frequency identification (RFID) tag is provided with an associated tire to be monitored. A dipole antenna structure is coupled to the RFID tag and routed to a position in a tire tread and routed across a cross-section of the associated tire. A resonant frequency of the dipole antenna structure is detected to monitor tire tread wear and patterns of wear.

Figure 1:
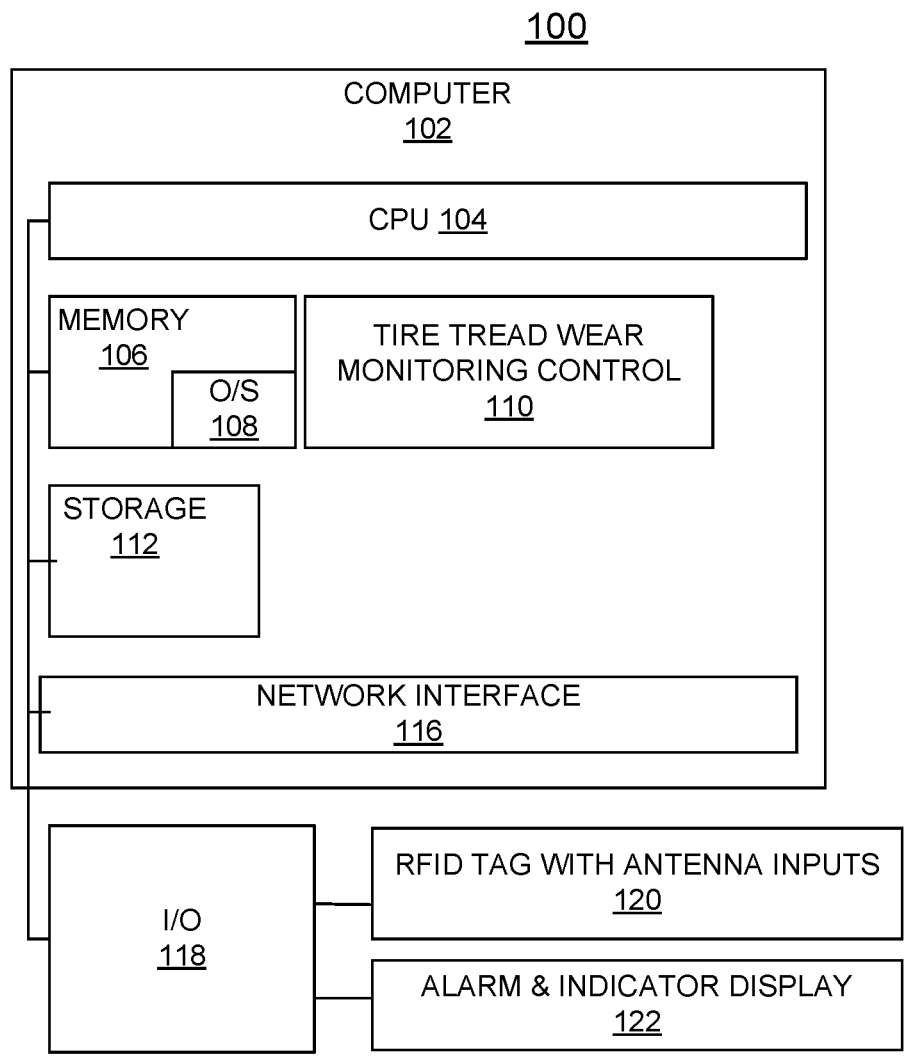
FIG. 1 provides a block diagram of an example system for implementing tire tread depth and wear patterns monitoring with the use of radio frequency identification (RFID) devices or tags in accordance with preferred embodiments.

Having reference now to the drawings, in FIG. 1, there is shown an example system embodying the present disclosure generally designated by the reference character 100 for implementing enhanced tire tread depth and wear patterns monitoring with the use of radio frequency identification (RFID) tags in accordance with preferred embodiments. System 100 includes a computer system 102 including one or more processors 104 or general-purpose programmable central processing units (CPUs) 104. As shown, computer system 102 includes a single CPU 104; however, system 102 can include multiple processors 104.

Computer system 102 includes a system memory 106 including an operating system 108 and a tire tread depth monitoring control 110 in accordance with preferred embodiments. System memory 106 is a random-access semiconductor memory for storing data, including programs. System memory 106 is comprised of, for example, a dynamic random access memory (DRAM), a synchronous direct random access memory (SDRAM), a current double data rate (DDRx) SDRAM, non-volatile memory, optical storage, and other storage devices.

Computer system 102 includes a storage 112, a network interface 116 and an I/O interface 118 for transferring data to and from RFID tag and antenna inputs 120 and an alarm and indicator display 122 in accordance with preferred embodiments.

In accordance with features of the disclosure, computer system 102 of the preferred embodiment includes tire tread wear monitoring control logic 110 for processing RFID tag and antenna inputs 120 and using the processed RFID tag and antenna inputs to detect a resonant frequency of the dipole antenna structure to monitor tire tread change.

Figure 2:
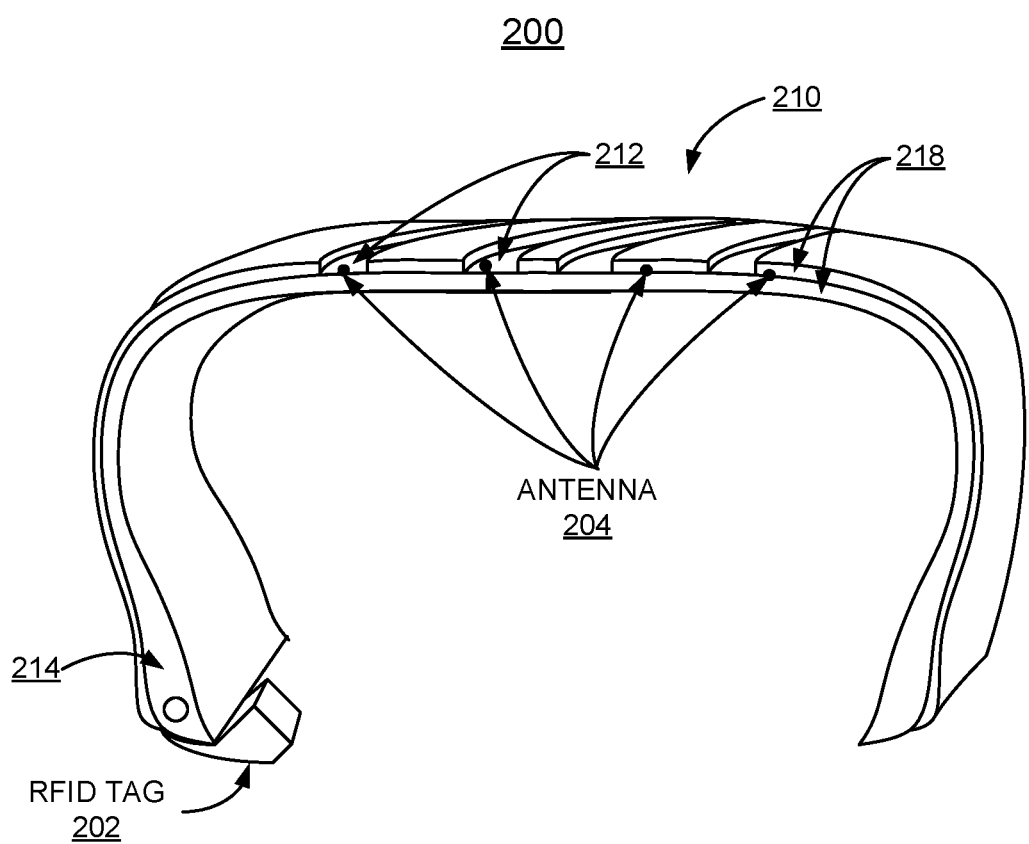
FIG. 2 schematically illustrates an example RFID tag and antenna with a portion of an associated tire to be monitored in the system of FIG. 1 in accordance with preferred embodiments.

In accordance with features of the disclosure, FIG. 2 schematically illustrates an example structure generally designated by the reference character 200 including an RFID tag 202 and antenna 204 with a portion of an associated tire 210 to be monitored in the system 100 of FIG. 1 in accordance with preferred embodiments. The associated tire 210 to be monitored includes tire treads 212 and a non-tread portion 214 of the tire on which the RFID tag 202 is provided. The RFID tag 202 is used to sense a resonant frequency in the antenna 204 and further to signal when a predetermined change in the resonant frequency has occurred to generate an alarm or alert on display 122. The antenna 204 is shown within tread 212 and between tire ply 218, and is mounted within different sections (not shown) of the treads 212.

In accordance with features of the disclosure, the RFID tag 202 is not located in a tire tread 212, the RFID tag 202 is mounted on a rim (not shown) on which the tire 210 is mounted. The RFID tag 202 optionally is mounted on a non-tread portion 214 of the tire 210, as shown in FIG. 2.

In accordance with features of the disclosure, the RFID tag 202 is not embedded within layers of the tire as provided in conventional monitoring arrangements. Embedding an RFID tag and antenna within the tire changes the rubber laminate and materials, adding both cost, complexity and risk to the end product. Structure 200 utilizes the RFID tag 202 and antenna 204, in a manner which lowers the risk and impacts to the tire laminate resulting from prior art arrangement. The antenna 204 is coupled to the RFID tag 202 and is routed from the RFID tag 202 to a position in the tire tread 212 and routed substantially circumferentially in the tire tread.

In accordance with features of the disclosure, the antenna 204 advantageously includes a dipole antenna structure coupled to the RFID tag 202 and routed to a position in the tire tread and routed substantially circumferentially in the tire tread of the associated tire 210. A resonant frequency of the dipole antenna structure 204 is detected to monitor tire tread wear.

In accordance with features of the disclosure, the dipole antenna structure is mounted in the tire tread across the cross-section of the associated tire and coupled to the RFID tag 202, which is mounted without being embedded within tire layers of the associated tire.

Figure 3:
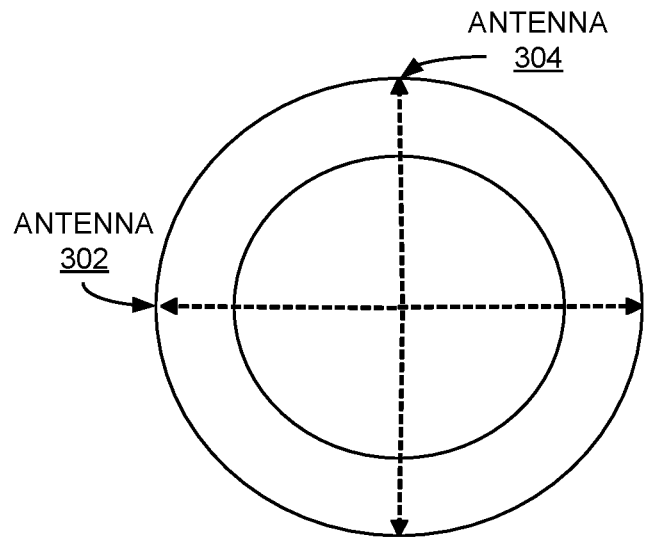
FIGS. 3, 4, and 5 illustrate example dipole antenna structures for respectively detecting point wear, arc wear and ripple wear of the tire tread of the associated tire being monitored.
Figure 4:
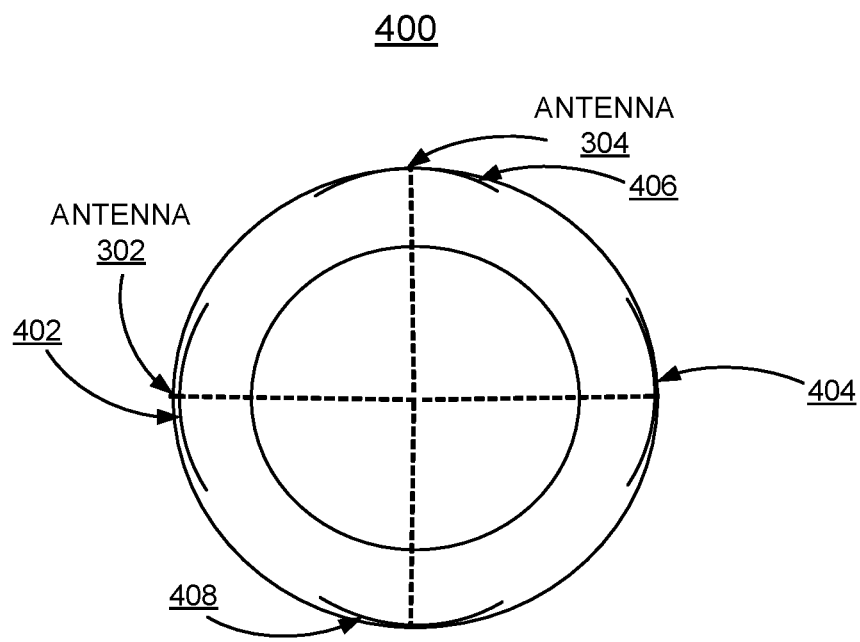
Figure 5:
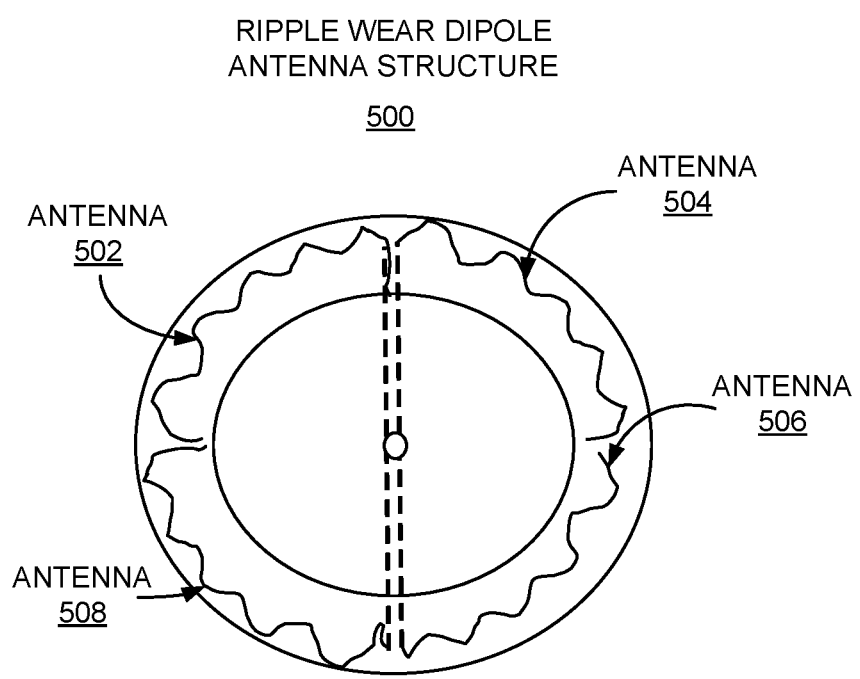

Referring now to FIGS. 3, 4, and 5 there are shown example dipole antenna structures for respectively detecting point wear, arc wear and ripple wear of the tire tread of the associated tire being monitored.

In FIG. 3, an example dipole antenna structure generally designated by the reference character 300 includes two antenna 302, 304. The dipole antenna structure 300 is used, for example, for monitoring point wear on the tire 200 shown in FIG. 2. Point Wear involves use of two antenna 302, 304 rendering a di-pole structure. These two antenna 302, 304 are embedded within the layers of the tire 200, such that the length of the antenna is reduced as the tire wears resulting in detectable resonant frequency change. This embodiment of dipole structure 300 allows for general tread wear monitoring with the fewest number of antenna, while still maintaining advantages over existing art.

For example, the length of the antenna is inversely proportional to the resonant frequency. The RFID tag 202 reader measures the frequency of the returned data RFID tag 202, as the tire and antenna wears. For example a decrease the length of antenna by 1 mm provides resonance changes of about 2 MHz, where 1 mm=39.37 mils which is <$\frac{1}{16}$" which represents reasonable tire wear which the user cares about. Such tire wear and frequency change is used to signal when a predetermined change in the resonant frequency has occurred to generate an alarm or alert on display 122.

In FIG. 4, an example dipole antenna structure generally designated by the reference character 400 similarly includes two antenna 302, 304. The dipole antenna structure 400 is used, for example, for monitoring arc wear on the tire 200 shown in FIG. 2. Arc wear also utilizes a di-pole antenna structure, yet modified such that respective ends 402, 404, 406, 408 of each antenna 302, 304 contain an additional feature which traverses a portion of the tire arc, perpendicular to the axis of rotation. This embodiment dipole of antenna structure 400 provides a finer granularity of tread wear, as well as the ability to detect flat spots in the four end locations 402, 404, 406, 408. Such flat spots in the tire 200 can result from circumstances such as abnormal breaking conditions.

In FIG. 5, an example dipole antenna structure generally designated by the reference character 500 includes four antenna 502, 504, 506, and 508. The dipole antenna structure 500 is used, for example, for monitoring ripple wear on the tire 200 shown in FIG. 2. Ripple wear involves use of four or more antenna 502, 504, 506, and 508 which are routed in a sinusoidal fashion that is a "ripple" fashion, within the outermost z-axis of the tire 200. The embodiment of dipole antenna structure 500 provides the finest granularity of tire wear detection capabilities including but not limited to uneven tread wear, cupping, flat-spot detection and tire ply delamination.

Figure 6:
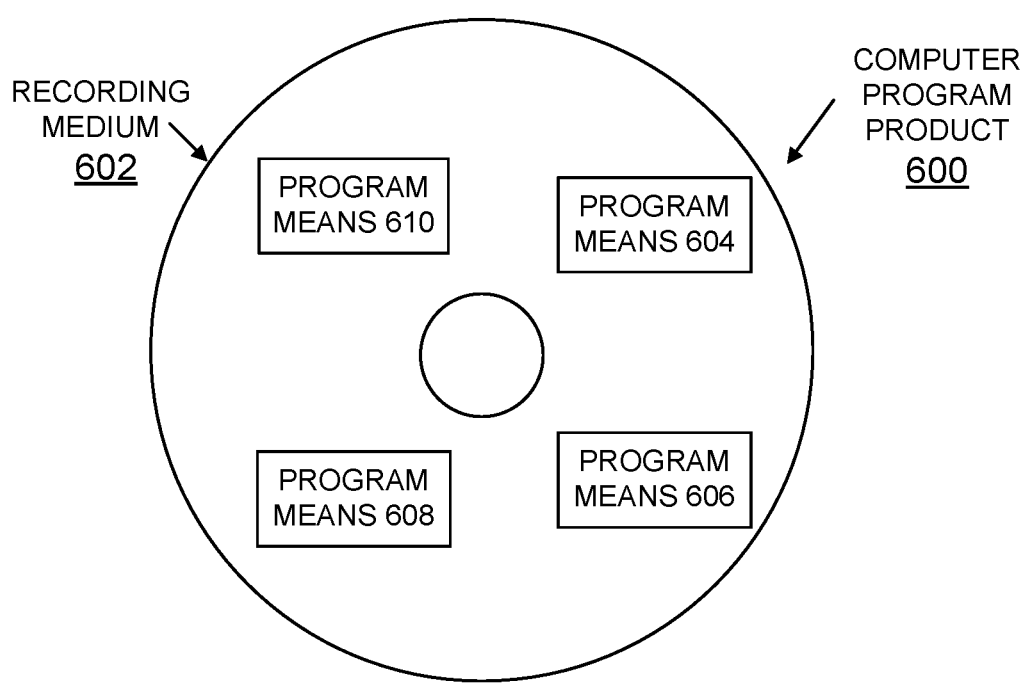
FIG. 6 is a block diagram illustrating a computer program product in accordance with the preferred embodiment.

Referring now to FIG. 6, an article of manufacture or a computer program product 600 of the disclosure is illustrated. The computer program product 600 is tangibly embodied on a non-transitory computer readable storage medium that includes a recording medium 602, such as, a floppy disk, a high capacity read only memory in the form of an optically read compact disk or CD-ROM, a tape, or another similar computer program product. The computer readable storage medium 602, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Recording medium 602 stores program means or instructions 604, 606, 608, and 610 on the non-transitory computer readable storage medium 602 for carrying out the methods for implementing tire tread depth and wear patterns monitoring with the use of radio frequency identification (RFID) tags in the system 100 of FIG. 1.

Computer readable program instructions 604, 606, 608, and 610 described herein can be downloaded to respective computing/processing devices from a computer readable storage medium or to an external computer or external storage device via a network, for example, the Internet, a local area network, a wide area network and/or a wireless network. The computer program product 600 may include cloud based software residing as a cloud application, commonly referred to by the acronym (SaaS) Software as a Service. The network may comprise copper transmission cables, optical transmission fibers, wireless transmission, routers, firewalls, switches, gateway computers and/or edge servers. A network adapter card or network interface in each computing/processing device receives computer readable program instructions 604, 606, 608, and 610 from the network and forwards the computer readable program instructions for storage in a computer readable storage medium within the respective computing/processing device.

A sequence of program instructions or a logical assembly of one or more interrelated modules defined by the recorded program means 606, 606, 608, and 610, direct the system 100 for implementing tire tread depth and wear patterns monitoring with the use of radio frequency identification (RFID) tags of the preferred embodiment.

While the present disclosure has been described with reference to the details of the embodiments of the disclosure shown in the drawing, these details are not intended to limit the scope of the disclosure as claimed in the appended claims.

What is claimed is:

1. A system for implementing tire tread depth and wear patterns monitoring of a tire comprising:
   a radio frequency identification (RFID) tag;
   a dipole antenna structure disposed in a portion of the tire;
   a tire tread wear monitoring control logic,
   wherein the tire tread wear monitoring control logic tangibly embodied in a non-transitory machine readable medium configured to implement tire tread monitoring;
   wherein the tire tread wear monitoring control logic is configured to process inputs from the RFID tag and the dipole antenna;
   wherein the tire tread wear monitoring control logic is configured to detect a resonant frequency of the dipole antenna structure to monitor tire tread change based on the processed inputs; and
   wherein the dipole antenna structure is coupled to the RFID tag and includes more than one antenna, with the RFID tag detecting resonant frequency changes to monitor one of point wear and are wear in tire tread.

2. The system as recited in claim 1, further comprising:
   the tire tread wear monitoring control logic configured to identify a selected dipole antenna structure coupled to the RFID tag.

3. The system as recited in claim 2, wherein the dipole antenna structure a predefined number of antenna implementing the selected dipole antenna structure.

4. The system as recited in claim 1, further comprising: said tire tread wear monitoring control logic, configured to identify a resonant frequency change in the antenna.

5. The system as recited in claim 1, wherein said radio frequency identification (RFID) tag is mounted on a rim on which the tire is mounted.

6. The system as recited in claim 1, wherein the dipole antenna structure includes more than one antenna, with the RFID tag detecting resonant frequency changes to monitor ripple wear in tire tread.

7. The system as recited in claim 1, wherein said selected dipole antenna structure coupled to the RFID tag is routed to a position in said tire tread and routed circumferentially in the associated tire.

8. The system as recited in claim 1, wherein the dipole antenna structure is coupled to the RFID tag, wherein the RFID tag is configured to sense a resonant frequency in the dipole antenna structure and is further configured signal when a predetermined change in the resonant frequency has occurred.

9. The system as recited in claim 1, further comprising:
   control code stored on a non-transitory computer readable medium, and wherein said control code implements tire tread depth and wear patterns monitoring.

10. A method for implementing tire tread depth and wear patterns monitoring of a tire comprising:
    providing a radio frequency identification (RFID) tag coupled to a dipole antenna structure with an associated tire to be monitored;
    providing the dipole antenna structure with four antenna, and wherein the RFID tag detects resonant frequency changes to monitor ripple wear in tire tread,
    providing a dipole antenna structure disposed in a portion of the tire;
    providing a tire tread wear monitoring control logic,
    wherein the tire tread wear monitoring control logic tangibly embodied in a non- transitory machine readable medium configured to implement tire tread monitoring;
    wherein the tire tread wear monitoring control logic, processes inputs from the RFID tag and the dipole antenna; and
    wherein the tire tread wear monitoring control logic, detects a resonant frequency of the dipole antenna structure to monitor tire tread change based on the processed inputs; and
    wherein said radio frequency identification (RFID) tag is mounted within a non-tread portion of the tire.

11. The method as recited in claim 10, wherein providing a radio frequency identification (RFID) tag includes mounting a radio frequency identification (RFID) tag on a rim mounting the associated tire.

12. The method as recited in claim 10, comprising coupling the dipole antenna structure to the RFID tag.

13. The method as recited in claim 12, wherein coupling the dipole antenna structure to the RFID tag comprises routing the dipole antenna structure to a position in a tire tread and routing the dipole antenna structure substantially circumferentially in the associated tire, wherein routing the dipole antenna structure substantially circumferentially routes the structure around a circumference of the associated tire.

14. The method as recited in claim 12, includes providing the dipole antenna structure with more than one antenna, and wherein the RFID tag detects resonant frequency changes to monitor one of point wear and arc wear in tire tread.

15. The method as recited in claim 10, wherein the tire tread wear monitoring control logic, processes inputs from the RFID tag and the dipole antenna and further provides a signal when a predetermined change in the resonant frequency has occurred.

16. The system of claim 1 wherein said radio frequency identification (RFID) tag is mounted within a non-tread portion of the tire.

* * * * *